July 14, 1931.  G. PAPPADAKES  1,814,846
AEROPLANE
Filed May 22, 1930   3 Sheets-Sheet 1
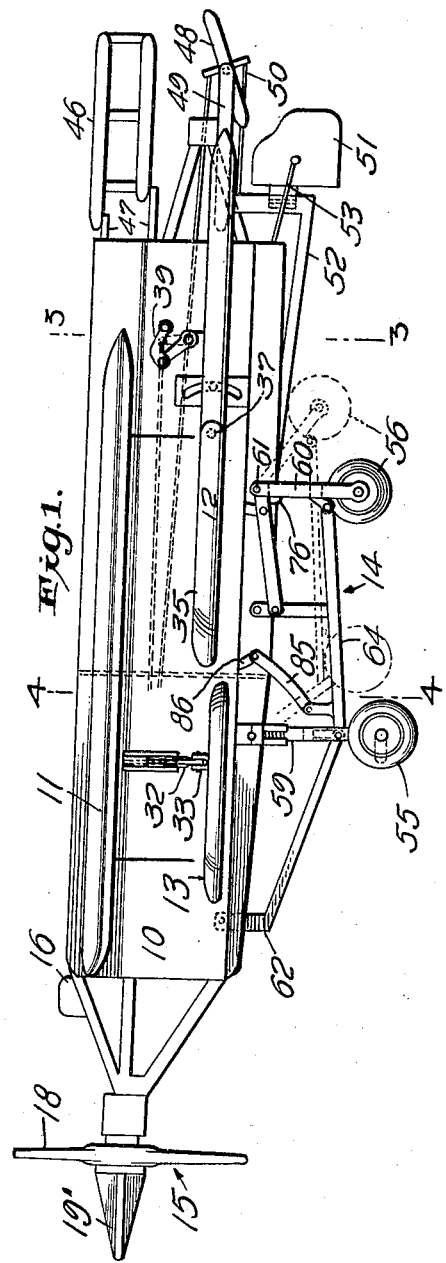
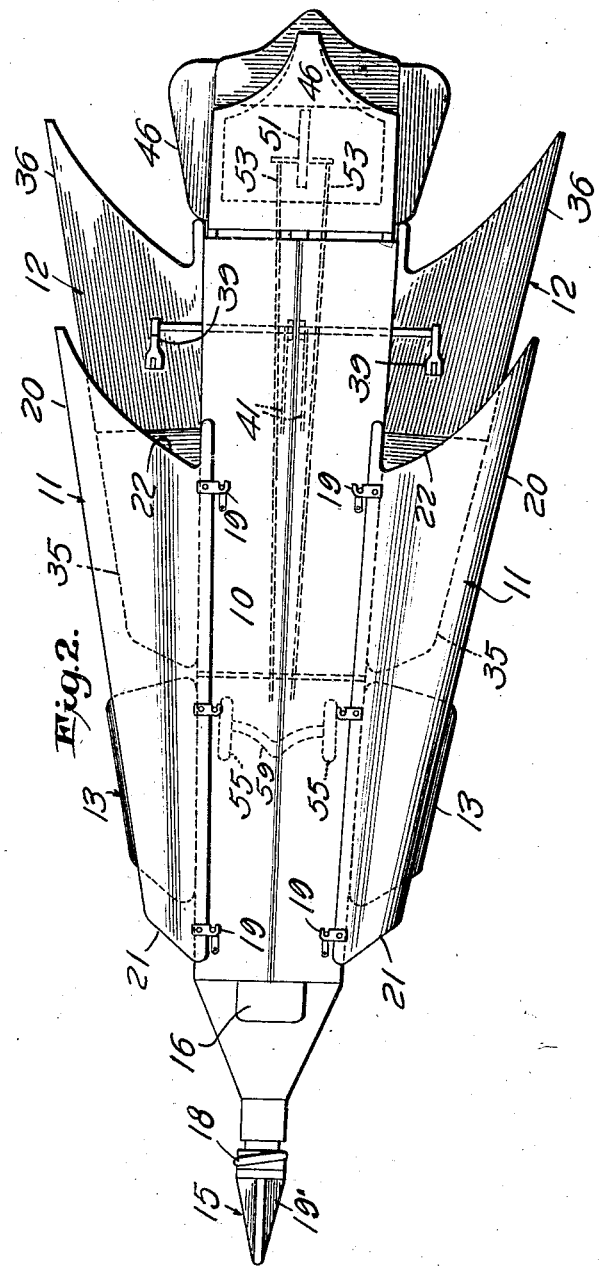
INVENTOR
Gust Pappadakes
BY
HIS ATTORNEY July 14, 1931.  G. PAPPADAKES  1,814,846
AEROPLANE
Filed May 22, 1930   3 Sheets-Sheet 2

INVENTOR
Gust Pappadakes,
BY
HIS ATTORNEY

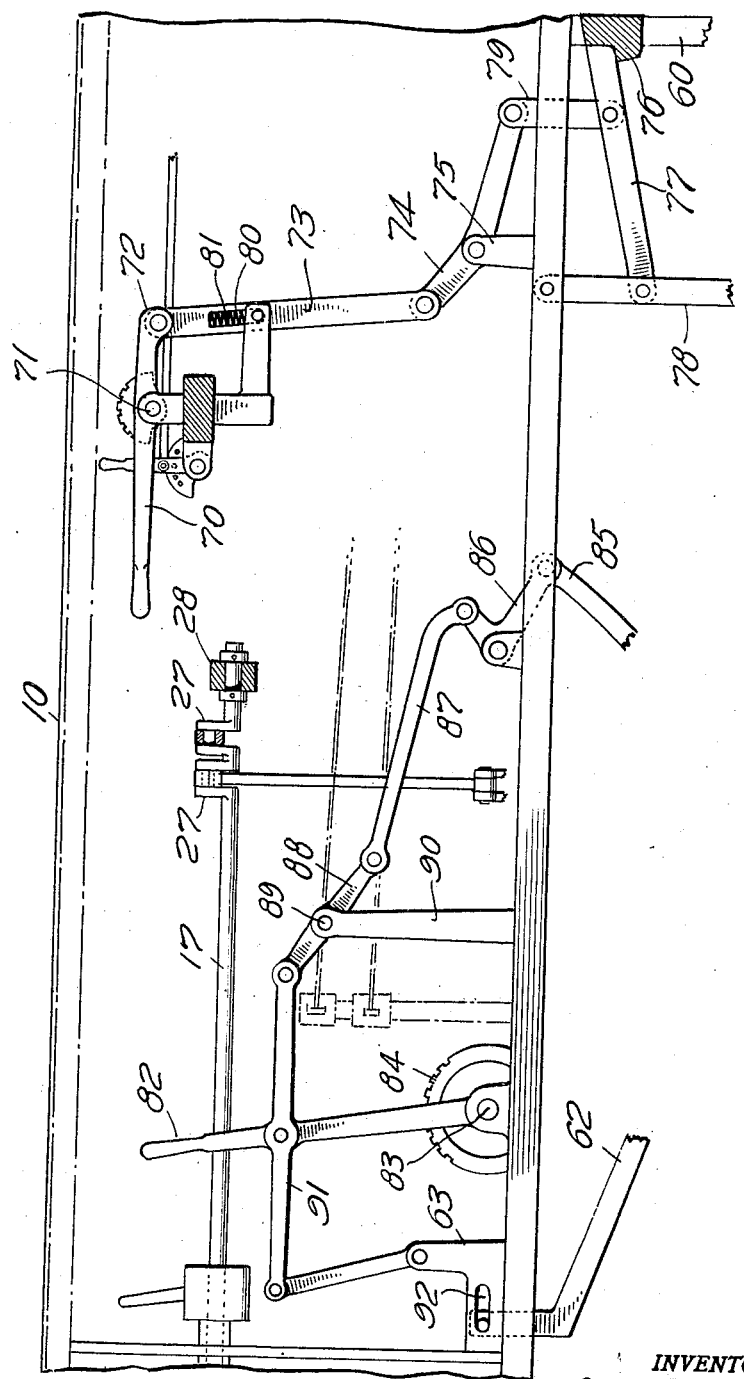

Patented July 14, 1931

1,814,846

UNITED STATES PATENT OFFICE

GUST PAPPADAKES, OF BRONX, NEW YORK

AEROPLANE

Application filed May 22, 1930. Serial No. 454,605.

My present invention relates to aircraft, one of the principal objects of the invention residing in a structure which is capable of arising and alighting without the usual longitudinal running along the ground. In the use of aeroplanes, many difficulties are encountered and many accidents result by reason of the rough ground upon which a landing must be made and after landing it is often difficult or even impossible to rise again from the ground. In carrying out my invention to effect, I provide an aeroplane which is capable of straight line and curved line flights in the usual manner.

A further object of the invention is to provide simple, reliable and efficient means for driving and adjusting the propelling and stabilizing means whereby my improved aircraft may be safely handled under the most adverse weather conditions.

A still further object of my invention resides in a novel mechanism whereby the landing gear may be readily collapsed and folded or swung under the body of the plane for effectually eliminating a great deal of air resistance.

With the above and other objects of the invention which will be apparent as the description of the invention proceeds, it consists of the features of construction, combination and arrangements of parts hereinafter fully described and claimed, reference being had to the accompanying drawings, in which:

Figure 1 is a side elevation of my improved aircraft;

Figure 2 is a top plan view thereof;

Figure 5 is a central longitudinal sectional view, parts broken away.

Figure 3:
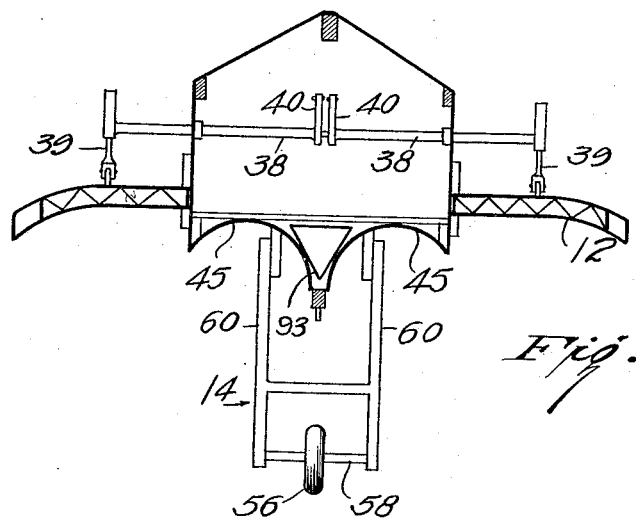
Figure 3 is a transverse sectional view taken on the line 3—3 of Figure 1.

My invention, in the form or embodiment shown in the drawings and briefly described, comprises a body, 10, a pair of stationary fins or blades, 11, which are disposed lengthwise near the upper end of the body, 10, a pair of fins, 12, which are mounted one on either side of the body, 10, a portion of which is subject to deflection, a pair of flap or wing sections, 13, which are pivotally mounted to the body, 10, for the purpose of effectually raising or lifting the aircraft, a landing gear indicated generally as at 14, and propelling means, 15.

The propelling means, 15, which is utilized for moving the aircraft in a forward direction is driven by the motor indicated diagrammatically as at 16, and is located on the forward end of the drive shaft, 17. Forwardly extending from the hub of the propeller, 18, I provide a member, 19', which is formed of a plurality of forwardly converging fins for the purpose of more readily piercing the air and stabilizing the aeroplane during its rapid revolution.

The upper pair of stationary fins, 11, may be removably secured to the body, 10, of the aircraft by means of the latches or lugs, 19, and their coacting pins. While the inner opposing edges of these fins are substantially parallel with respect to each other, the outer edges, 20, diverge rearwardly. The front edges, 21, of the fins, 11, are likewise tapered for the purpose of eliminating a great deal of the air resistance while the aircraft is in flight. The rear end of each of the plane fins, 11, is provided with a cut-away and curved portion, 22, which permits the current of air to more readily follow the sides of the aircraft for effectually stabilizing it when in operation. The front and rear edges of the fins, 11, are preferably rounded as is clearly indicated in Figure 1 for the purpose of further eliminating any counter resistance.

Figure 4:
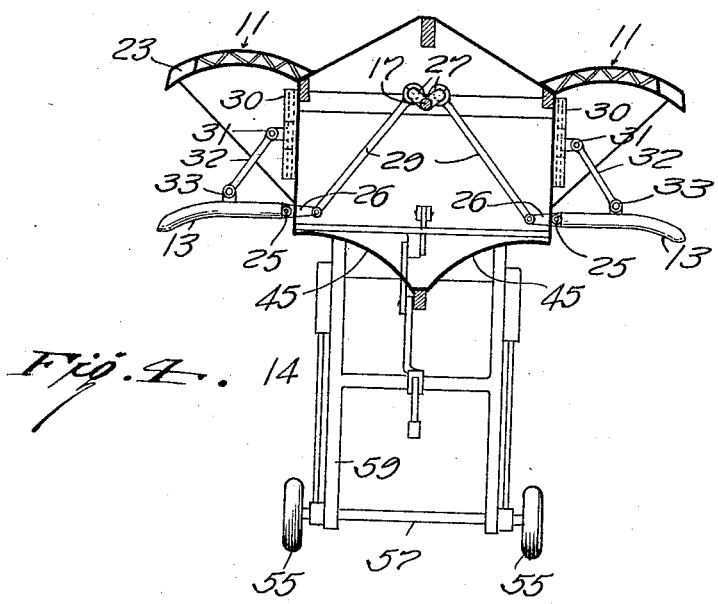
Figure 4 is a similar view taken on the line 4—4 of Figure 1.

As is clearly shown in Figure 4 of the accompanying drawings, the stationary fins or plane sections, 11, are curved in cross section and extend in a lengthwise direction. This not only presents a greater area lifting or supporting surface to the fins, but they will serve as an effective means for stabilizing the aircraft while in flight. Longitudinal air pockets, 23, are formed along the outer edges of the fins, 11, for the purpose of more readily balancing them. Suitable braces are provided within these fins for rigidly supporting them and preventing their collapse.

Referring now to the plane sections or lifting fins, 13, which are employed for the lifting of the aircraft, the pivotal mounting for these lifting fins is indicated as at 25, which are formed between the rearwardly extending arm portions, 26, and the side walls of the aircraft. The main drive shaft, 17, is provided with a pair of crank portions, 27, adjacent to one of the bearings, 28, for the purpose of imparting the oscillatory motion to the lifting fins, 13, which is accomplished by means of the connecting rods, 29. It is obvious, of course, that the throw or swing of the cranks, 27, will be of such a predetermined length as to permit the upward and downward movement of the lifting fins, 13, during the rotation of the main shaft, 17. Vertically mounted guideways, 30, are located on the outer sides of the body, 10, for the purpose of receiving slide members, 31, which are employed for rigidly supporting the oscillatory mounted fins, 13, during their movement for raising the aircraft. Relatively short connecting rods, 32, are pivotally connected between the slides, 31, and the lugs, 33, which are carried by the fins, 13.

Referring now to the fins or plane sections, 12, forming a part of my invention, it will be noted that the front portions, 35, thereof are rigidly secured to the side walls of the body, 10, whereas the rear portions or halves, 36, are movable with respect thereto. Although I prefer to connect these half sections by means of pivots, 37, yet it is to be understood they may be flexibly connected in any other desired manner. These rear sections, 36, may be relatively moved through the medium of the transversely extending shaft sections, 38, and suitable links, 39, which are connected to the upper surface of the movable sections, 36. The shaft sections, 38, are each provided with relatively short arms, 40, on the inside of the body, 10, from which are connected operating cables or rods, 41, which extend to the forward part of the craft in any suitable manner. It will now be readily understood that by raising or lowering the rear portions or sections, 36, of the planes, 12, the aircraft will be caused to either raise or lower. Then, too, they may be raised or lowered at varying degrees when it is desired to bank the craft, as, for example, in executing a turn.

It may be here stated that the lower sides or bottom sections of the body member, 45, is concaved for the purpose of forming an elongated air pocket along the bottom of each side thereof. This is clearly indicated in Figures 3 and 4. The depth of the concaved portions, 45, are noticeably increased at the front and rear portions of the body portion, 10.

A pair of superimposed and relatively narrow stabilizing fins, 46, are located at the extreme rear end of the body, 10, and are supported to the body by means of the brackets or arms, 47. The elevator, 48, is likewise mounted at the rear portion of the body, 10, and supported by means of the arms, 49, and operated through the medium of the cords or wires, 50, whereas, the rudder, 51, is pivotally mounted to the support, 52, and operable by means of the cables, 53.

Referring now to the landing gear associated with my invention, the ground wheels, 55 and 56, are mounted upon their respective shafts, 57 and 58. The front wheels, 55, are supported by means of the frame, 59, whose upper end is pivotally mounted to the bottom of the body, 10, whereas the rear ground wheel, 56, is carried by the frame, 60, and is likewise pivoted as at 61, to the body, 10. A brace, 62, is connected between the frame, 59, of the front wheels and a slotted bracket, 63, on the bottom of the body, 10. Each of the wheel supporting frames, 59 and 60, are also connected by means of pivotal rods or side bars, 64, so that they may both move simultaneously when desired.

The latching or locking mechanism associated with the landing mechanism, 14, is clearly shown in detail in Figure 5, and comprises the hand operating lever, 70, pivoted at 71, to a stationary portion of the frame member within the body, 10, and provided with an extension having a pivot, 72. A connecting lever, 73, is operably mounted between the pivotal point, 72, and the pivotally mounted arm, 74. The arm, 74, is supported upon the body, 10, by means of the arm or bracket, 75. A ledge, 76, is formed near the upper end of the frame, 60, for the purpose of supporting the pivotally mounted latch, 77, which is, in turn, supported by the vertically extending arm, 78. The link, 79, is pivoted at its uper end to the arm, 74, and at its lower end to the latch member, 77. Referring again to the connecting lever, 73, it will be noted that a slot, 80, is formed therein for the purpose of receiving and housing a coil spring, 81, for the purpose of normally retaining the lever, 73, in its upper or raised position.

When it is desired to release the latching mechanism so that the landing gear may collapse, it is merely necessary to lift the operating lever, 70, which will dispose the connecting lever, 73, and operate the arm, 74, to lift the latch, 77, through the medium of the link, 79, thereby freeing the extreme outer end of the latch member, 77, with respect to the upper end of the frame, 60.

When it is desired to replace the landing gear into its operative position, as when landing, the lever, 82, which is pivoted as at 83, to the segmental rack, 84, is operated so as to cause the downward movement of the link, 85, which is, in turn, connected to the connecting side bars, 64. This is accomplished through the medium of the bell crank lever, 86, the connecting arm, 87, and the arm, 88, which is, in turn, pivoted as indicated at 89, to the stationary support, 90. The arm, 91, has pivotal connection between the operating lever, 82, and the arm, 88.

It may be here stated that the slot, 92, formed in the slotted bracket, 63, is of a predetermined length to permit the full collapsing of the landing gear under the body of the aircraft.

Although I have shown several of the fins or plane sections as being substantially flat, it is to be understood that I may find it desirable to curve all of them as has been done in the instance of the fins, 11. Then, too, instead of forming both of the cranks, 27, on the single shaft, 17, it may be more desirable to have a pair of crank shafts mounted alongside of each other, for, in this manner, both of the lifting fins may be caused to move up and down simultaneously.

A fuel tank 93 extending substantially half the length of the plane is provided. This fuel tank is located centrally and when filled with fuel helps stabilize the plane.

In the foregoing manner an aeroplane is provided in which great speed may be attained with a maximum amount of safety. The large space in the rear of the plane may be utilized to carry a number of passengers or substantial amounts of merchandise and it is a desirable feature to have this weight situated in the rear of the plane. An aeroplane is further provided which will alight in a small area due to the fact that it may arise or land in an almost vertical plane. The narrow wing spread greater speed and less head resistance and the concave portions 45 provide great stability.

What I claim is:

1. An aircraft comprising a substantially elongated body, a pair of relatively stationary fins near the upper end thereof, said fins being disposed lengthwise of said body and tapering from the aft to the fore regions, a pair of oscillatory fins mounted below the forward part of said stationary fins, a motor, means for operating said last named fins from the motor, and a pair of pivotally mounted fins for causing the deflection of said aircraft.

2. An aircraft comprising an elongated body having substantially parallel sides and a pair of relatively stationary fins near the upper end thereof, said fins being disposed lengthwise of said body and tapering from the aft to the fore regions, a pair of oscillatory fins mounted below the forward part of said stationary fins, a motor, means for operating said last named fins from the motor, a pair of pivotally mounted fins for causing the deflection of said aircraft, and means for manually controlling the deflection of said pivotally mounted fins.

3. An aircraft comprising a substantially elongated body, a pair of relatively stationary fins near the upper end thereof, a pair of oscillatory fins mounted below said stationary fins, a motor, means for operating said last named fins from the motor, a pair of pivotally mounted fins, a pair of shafts extending across the said last named fins, a link connected between each of the shafts and the respective wing sections and means for manually controlling the deflection of said last named fins.

In testimony whereof I affix my signature.

GUST PAPPADAKES.